(12) United States Patent
Braun et al.

(10) Patent No.: US 6,177,992 B1
(45) Date of Patent: Jan. 23, 2001

(54) LOW INSERTION LOSS OPTICAL MONOCHROMATOR

(75) Inventors: David M. Braun; Loren F. Stokes, both of Santa Rosa, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/160,650

(22) Filed: Sep. 25, 1998

(51) Int. Cl.[7] ........................................ G01J 3/447
(52) U.S. Cl. ........................................... 356/327
(58) Field of Search ........................... 356/327, 322–323, 356/325, 326, 328, 329, 330–334, 364, 365, 300; 359/497, 501

(56) References Cited

U.S. PATENT DOCUMENTS

| 5,080,486 | 1/1992 | Shirasaki et al. . |
| 5,233,405 | * 8/1993 | Wildnauer et al. . |
| 5,608,521 | 3/1997 | DeLong . |
| 5,657,121 | 8/1997 | Nishina . |
| 5,886,785 | * 3/1999 | Lefevre et al. . |

FOREIGN PATENT DOCUMENTS

0027650 * 2/1987 (JP) .

* cited by examiner

*Primary Examiner*—K. P. Hantis
(74) *Attorney, Agent, or Firm*—John L. Imperato

(57) ABSTRACT

An optical monochromator has high signal selectivity and low insertion loss, and is well-suited for characterizing a variety of optical signals, including closely-spaced optical channels within DWDM systems. The optical monochromator includes a bulk-optic polarization beam splitter that separates orthogonal polarization states of an applied optical signal into separate optical beams. Low insertion loss is achieved by reconciling the polarization states of the separate optical beams to an optimum polarization state that minimizes insertion loss when the optical beams are applied to a dispersive element. High signal selectivity is achieved using a multipass configuration and by illuminating large areas of the dispersive element, since large beam diameters are accommodated by the bulk-optic polarization beam splitter.

15 Claims, 2 Drawing Sheets

LOW INSERTION LOSS OPTICAL MONOCHROMATOR

BACKGROUND OF THE INVENTION

Optical monochromators characterize spectral content of optical signals, such as optical channels within dense wavelength division multiplexed (DWDM) optical communication systems. High signal selectivity and low insertion loss are increasingly important performance parameters of a monochromator as the optical channels within DWDM systems become more closely spaced. For example, signal selectivity of at least 35 dB at 0.4 nanometer offsets from the optical channel's center wavelength is desirable to sufficiently characterize wavelength, power and signal-to-noise ratio (SNR) of optical signals within a DWDM system having a channel spacing of 100 GHz, whereas higher signal selectivity, at least 35 dB at 0.2 nanometer offsets, is desirable for a channel spacing of 50 GHz. Low insertion loss is important for measuring low amplitude noise in SNR measurements of a DWDM system.

Grating-based optical monochromators that use multipass configurations have high signal selectivity. However, grating-based monochromators that are physically compact, such as those using a Littman-Metcalf configuration, typically have high insertion loss which degrades measurement sensitivity and may render the monochromators unsuitable for measuring SNR. Walk-off crystals separate polarization states of optical signals into separate optical beams which enables the polarization states to be aligned to minimize insertion loss, thereby improving the measurement sensitivity of the monochromator. However, optical beams having large diameter are not readily accommodated by presently available walk-off crystals, which reduces illumination area of the grating, in turn decreasing the signal selectivity of the optical monochromator. Accordingly, there is a need for an optical monochromator that has both high signal selectivity and low insertion loss.

SUMMARY OF THE INVENTION

According to the preferred embodiment of the present invention an optical monochromator has high signal selectivity and low insertion loss, and is well-suited for characterizing a variety of optical signals, including closely-spaced optical channels within DWDM systems. The optical monochromator is physically compact and includes a bulk-optic polarization beam splitter having a polarizing interface and an angled surface that separate orthogonal polarization states of an applied optical signal into separate optical beams. Low insertion loss is achieved by reconciling the polarization states of the separate optical beams to an optimum polarization state that minimizes insertion loss when the optical beams are applied to a dispersive element. High signal selectivity is achieved using a multipass configuration and by illuminating large areas of the dispersive element, since large beam diameters are accommodated by the bulk-optic polarization beam splitter.

DETAILED DESCRIPTION OF THE PREFERRED EMBODIMENT

Figure 1:
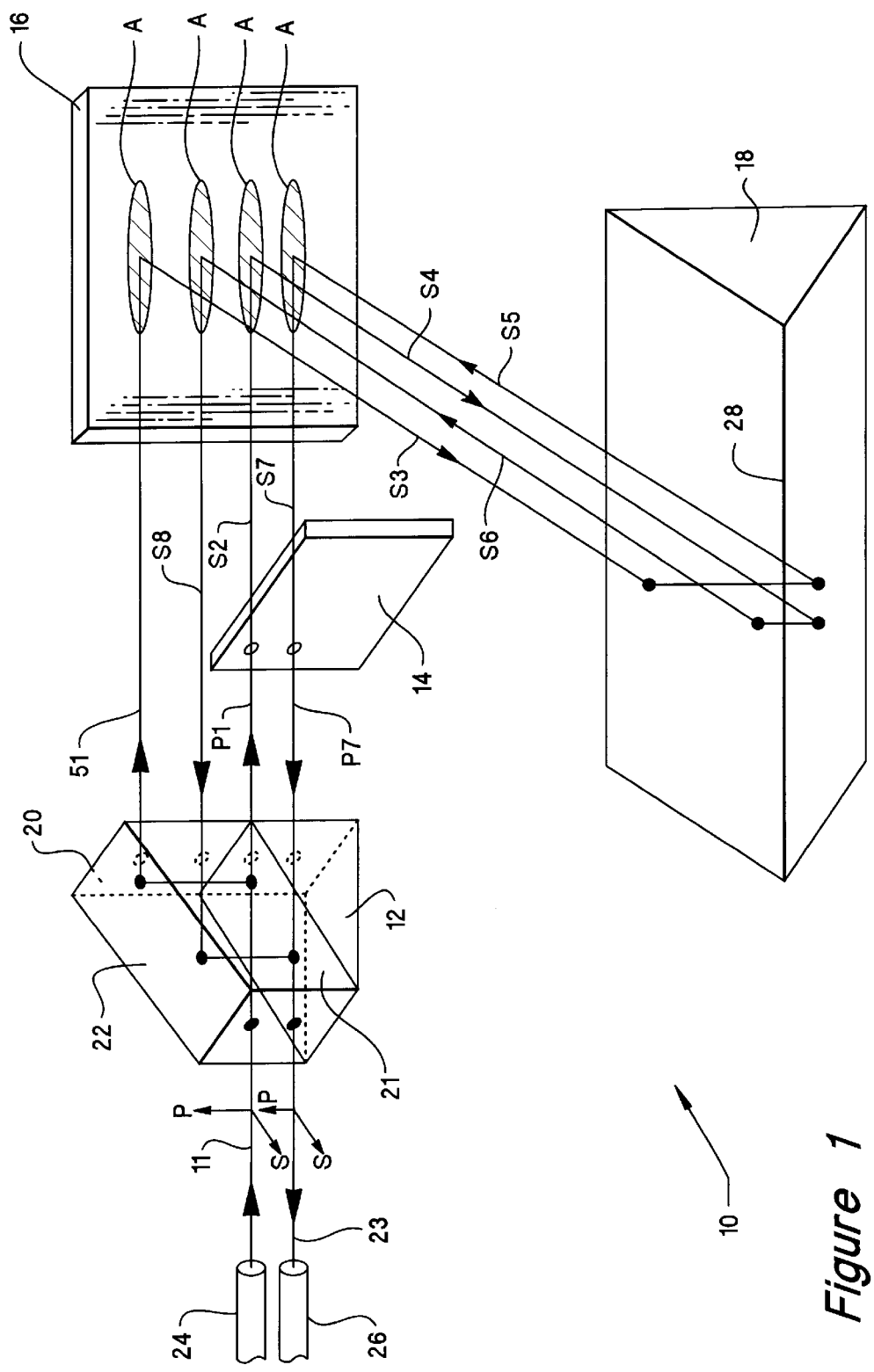
FIG. 1 shows an optical monochromator constructed according to a preferred embodiment of the present invention.
Figure 2B:
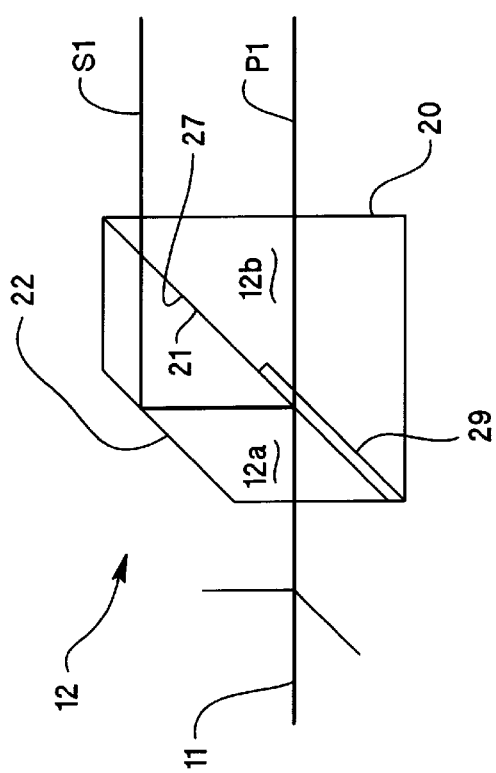
FIGS. 2A and 2B show detailed views of alternative types of bulk-optic polarization beam splitters included in the optical monochromator shown in FIG. 1.
Figure 2A:
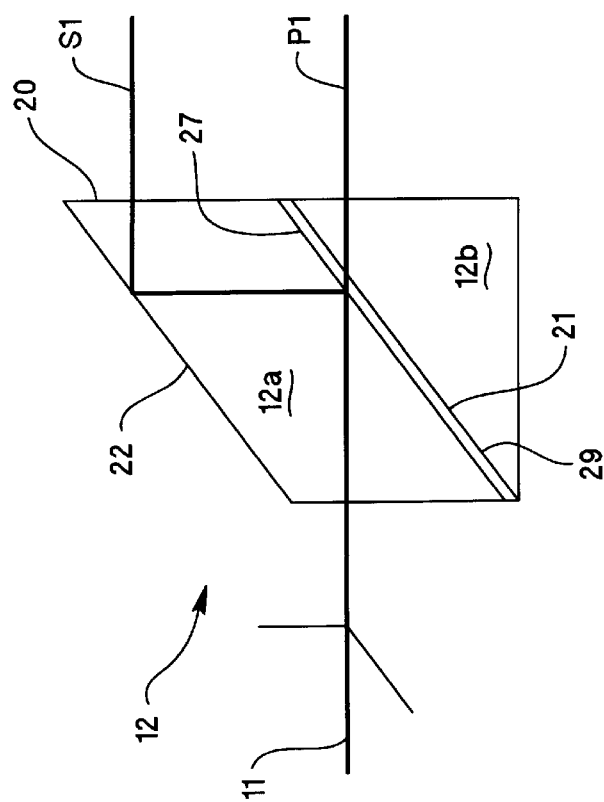

FIG. 1 shows an optical monochromator 10 constructed according to a preferred embodiment of the present invention. The monochromator 10 is useful for characterizing spectral content of applied optical signals and is typically included within an optical spectrum analyzer or other measurement instrument, or alternatively, within an optical communication system monitor. The monochromator 10 includes a bulk-optic polarization beam splitter 12, a polarization rotator 14, a dispersive element 16, such as a diffraction grating, and a reflector 18. An optical input beam 11 is applied to the bulk-optic polarization beam splitter 12 from an optical fiber 24 or other source. The light within the input beam 11 is separated into two orthogonal polarization components or polarization states, designated as S and P, by the bulk-optic polarization beam splitter 12. Detailed views of the bulk-optic polarization beam splitter 12 are shown in FIGS. 2A and 2B. A polarizing interface 21 within the bulk-optic polarization beam splitter 12 transmits P-polarized light to the back surface 20 where it emerges as a P-polarized optical beam P1. The interface 21 of the bulk-optic polarization beam splitter 12 reflects S-polarized light toward an angled surface 22 of the bulk-optic polarization beam splitter 12 where the S-polarized light is reflected and directed toward the back surface 20. The S-polarized light also emerges from the back surface 20 as an S-polarized optical beam S1.

The optical beam P1 propagates through polarization rotator 14 which rotates the polarization state of the optical beam P1 to the S-polarization state, forming an S-polarized optical beam S2.

The S-polarized optical beams S1, S2 are incident on the dispersive element 16. The dispersive element 16 is a diffraction grating, prism or other device that spatially separates applied optical beams according to the wavelength components or wavelength segments of the optical beams. Optical beam S3 and optical beam S4 emerge from the dispersive element 16 and correspond to a preselected optical wavelength segment of the applied optical input beam 11. Other optical beams corresponding to optical wavelengths of the input beam 11 emerge from the dispersive element 16 at various dispersion angles relative to the surface of the dispersive element, however, only optical beam S3 and optical beam S4 are shown in FIG. 1. The optical beams S3, S4 which correspond to a predetermined optical wavelength segment of the applied optical input beam 11 are spatially separated from the other optical beams (not shown) that correspond to other optical wavelength components of the input beam 11.

The optical beams S3, S4 are incident on the reflector 18, which is positioned to receive these output beams S3, S4 and which redirects the reflected S-polarized optical beams S5, S6 back toward the dispersive element 16. In this example, the reflector 18 is a retro-reflector which directs the optical beam S5 offset from optical beam S3, and directs the optical beam S6 offset from optical beam S4.

The S-polarized optical beams S7, S8 emerge from the dispersive element 16. The optical beam S7 propagates through polarization rotator 14 which changes the polarization state of the optical beam S7 to the P-polarization state, forming P-polarized optical beam P7. The optical beam P7 and optical beam S8 are incident on the bulk-optic polarization beam splitter 12 which combines the optical beam P7 and optical beam S8 into output beam 23. The P-polarized optical beam P7 propagates through the interface 21 of the bulk-optic polarization beam splitter 12 while the S-polarized optical beam S8 is incident on the angled surface 22 of the bulk-optic polarization beam splitter 12 where it is reflected and directed toward the interface 21. The interface 21 then directs this S-polarized optical beam S8 co-linear with the P-polarized beam P7 to form the output beam 23.

The monochromator 10 shown in FIG. 1 has the output beam 23 emerging from the bulk-optic polarization beam splitter 12 offset from the input beam 11. Alternatively, the output beam 23 is coincident with the input beam 11, for example, by using a reflector 18 which is a retro-reflector having an apex 28 positioned midway between optical beam S3 and optical beam S4. This positioning directs optical beam SS to be co-linear with optical beam S4 and optical beam S6 to be co-linear with optical beam S3. When optical beam S3 and optical beam S6 are co-linear, optical beam S1 and optical beam S8 are co-linear. When optical beam S4 and optical beam S5 are co-linear, optical beam S2 and optical beam S7 are co-linear. With the co-linear arrangement of optical beams, the input beam 11 and the output beam 23 are coincident and the input beam 11 and output beam 23 are coupled to the optical monochromator 10 using a single fiber 24.

Optical wavelength content is analyzed by detecting or otherwise processing the output beam 23. FIG. 1 shows a single mode fiber 26 intercepting output beam 23. Alternatively, a detector (not shown) intercepts the output beam 23. When a single mode fiber 26 is used, low optical coupling loss is achieved through precise alignment of the output beam 23 emerging from the bulk-optic polarization beam splitter 12 and the fiber 26. Precise alignment is provided when optical beam S1 and optical beam P1 from the bulk-optic polarization beam splitter 12 are parallel and when parallel arrangement of the optical beams is maintained within the monochromator 10 so that the optical beam S8 and optical beam P7 are parallel combined by the bulk-optic polarization beam splitter 12. The bulk-optic polarization beam splitter 12 is constructed to provide for the parallel arrangement of the optical beams within the monochromator 10.

FIGS. 2A and 2B show detailed views of alternative types of bulk-optic polarization beam splitters 12 included in the optical monochromator 10. The bulk-optic polarization beam splitters 12 include two glass portions, a first portion 12a and a second portion 12b. Optical beams S1 and optical beam P1 are shown emanating from the back surface 20 of the bulk-optic polarization beam splitters 12. Two surfaces 22 and 27 of a first portion 12a of the bulk-optic polarization beam splitter 12 are formed parallel to provide for a parallel alignment of the optical beams S1, P1. Using known bulk-optic processing techniques for fabricating optical windows, a parallelism of 0.0006 degrees is achieved for the two surfaces 22, 27 of the first portion 12a. Thin-film coating 29 on the surface 27 at the the interface 21 between the first portion 12a and second portion 12b causes polarization splitting of the applied optical beam 11. The bulk-optic polarization beam splitter 12 shown in FIG. 2A has a continuous flat back surface 20 as a result of alignment of the first portion 12a and the second portion 12b. The continuous back surface 20 maintains parallel orientation of the optical beams S1, P1 at the transition between the back surface 20 and the medium surrounding the bulk-optic polarization beam splitter 12. The bulk-optic polarization beam splitter 12 shown in FIG. 2B has a single, continuous flat back surface 20 that maintains parallel orientation of the optical beams S1, P1 at the transition between the back surface 20 and the medium surrounding the bulk-optic polarization beam splitter 12.

In this example, the optical monochromator is a Littman-Metcalf configuration in which uniformly polarized optical beams are incident on the dispersive element multiple times. The high signal selectivity of the monochromator 10 is attributable to the multiple passes of the optical beams on the dispersive element 16 and to the large areas A of the dispersive element 16 that are illuminated. Large illumination area is achieved because large diameter optical beams are readily accommodated by the bulk-optic polarization beam splitter 12. Repeated selection of similar wavelength segments at each of the multiple passes results in increased signal selectivity as the number of passes increases. Alternatively, the monochromator 10 is a single-pass configuration and the uniformly polarized optical beams S1, S2 are incident on the dispersive element 16. In the single pass configuration, the reflector 18 is absent and optical beams S3, S4 of the light dispersed by the dispersive element 16 are intercepted by a fiber, detector, aperture or other type of receiver. In the multipass configuration of FIG. 1 optical beam P7 and optical beam S8 are shown incident upon the bulk-optic polarization beam splitter 12. Alternatively, optical beams emitted from the dispersive element 16 are intercepted by a fiber, detector, aperture or other type of receiver.

The insertion loss of the dispersive element 16 is minimized by assuring that the polarization state of the optical beams S1, S2, S5, S6 incident on the dispersive element 16 are oriented relative to the dispersive element 16 for the maximum efficiency of the dispersive element 16.

While the preferred embodiment of the present invention has been illustrated in detail, it should be apparent that modifications and adaptations to those embodiments may occur to one skilled in the art without departing from the scope of the present invention as set forth in the following claims.

What is claimed is:

1. An optical monochromator, comprising:

a bulk-optic polarization beam splitter for receiving an input optical beam having an interface, an angled surface and a continuous exit surface, the interface transmitting a first optical beam corresponding to a first polarization state of the input optical beam and directing to the angled surface a second optical beam corresponding to a second polarization state of the input optical beam, the angled surface transmitting the second optical beam spatially offset from the first optical beam, at the continuous exit surface wherein the second polarization state is orthogonal to the first polarization state;

a dispersive element receiving the first optical beam and producing a first dispersed beam corresponding to a predetermined wavelength segment of the input optical beam, and receiving the second optical beam and producing a second dispersed beam corresponding to the predetermined wavelength segment of the input optical beam;

a polarization adjuster interposed between the bulk-optic polarization beam splitter and the dispersive element, aligning the orthogonal polarization states of the first optical beam and the second optical beam to a predetermined polarization state so that a single polarization state is incident upon the dispersive element.

2. The optical monochromator of claim 1 wherein the predetermined polarization state minimizes the insertion loss of the dispersive element.

3. The optical monochromator of claim 2 further comprising a receiver intercepting at least one of the first dispersed beam and the second dispersed beam.

4. The optical monochromator of claim 2 wherein the first optical beam and the second optical beam are parallel.

5. The optical monochromator of claim 2 wherein the polarization adjuster includes a polarization rotator that rotates the polarization state of one of the first optical beam and the second optical beam.

6. The optical monochromator of claim 5 wherein the polarization rotator includes a half-wave plate.

7. An optical monochromator, comprising:
   a bulk-optic polarization beam splitter for receiving an input optical beam having an interface, an angled surface and a continuous exit surface, the interface transmitting a first optical beam corresponding to a first polarization state of the input optical beam and directing to the angled surface a second optical beam corresponding to a second polarization state of the input optical beam, the angled surface transmitting the second optical beam spatially offset from the first optical beam, at the continuous exit surface wherein the second polarization state is orthogonal to the first polarization state;
   a dispersive element receiving the first optical beam and producing a first dispersed beam corresponding to a predetermined wavelength segment of the input optical beam, and receiving the second optical beam and producing a second dispersed beam corresponding to the predetermined wavelength segment of the input optical beam;
   a polarization adjuster interposed between the bulk-optic polarization beam splitter and the dispersive element, aligning the orthogonal polarization states of the first optical beam and the second optical beam to a predetermined polarization state so that the predetermined polarization state is incident upon the dispersive element; and
   a reflector intercepting the first dispersed beam and the second dispersed beam, and redirecting the first dispersed beam and the second dispersed beam to be incident upon the dispersive element, the dispersive element producing a third dispersed beam and a fourth dispersed beam, the third dispersed beam and the fourth dispersed beam corresponding to the predetermined wavelength segment of the optical signal.

8. The optical monochromator of claim 7 further comprising a receiver intercepting at least one of the third dispersed beam and the fourth dispersed beam.

9. The optical monochromator of claim 7 wherein the predetermined polarization state minimizes the insertion loss of the dispersive element.

10. The optical monochromator of claim 9 wherein the first optical beam is parallel to the second optical beam and the third dispersed beam is parallel to the fourth dispersed beam.

11. The optical monochromator of claim 10 wherein the third dispersed beam and the fourth dispersed beam are intercepted by the bulk-optic polarization beam splitter which combines the third dispersed beam and the fourth dispersed beam into an output optical beam.

12. The optical monochromator of claim 11 wherein the output optical beam is spatially offset from the input optical beam.

13. The optical monochromator of claim 11 wherein the output optical beam is co-linear with the input optical beam.

14. The optical monochromator of claim 12 further comprising a single mode fiber for receiving the output optical beam.

15. The optical monochromator of claim 13 further comprising a single mode fiber for receiving the output optical beam.

* * * * *